Patented Aug. 6, 1946

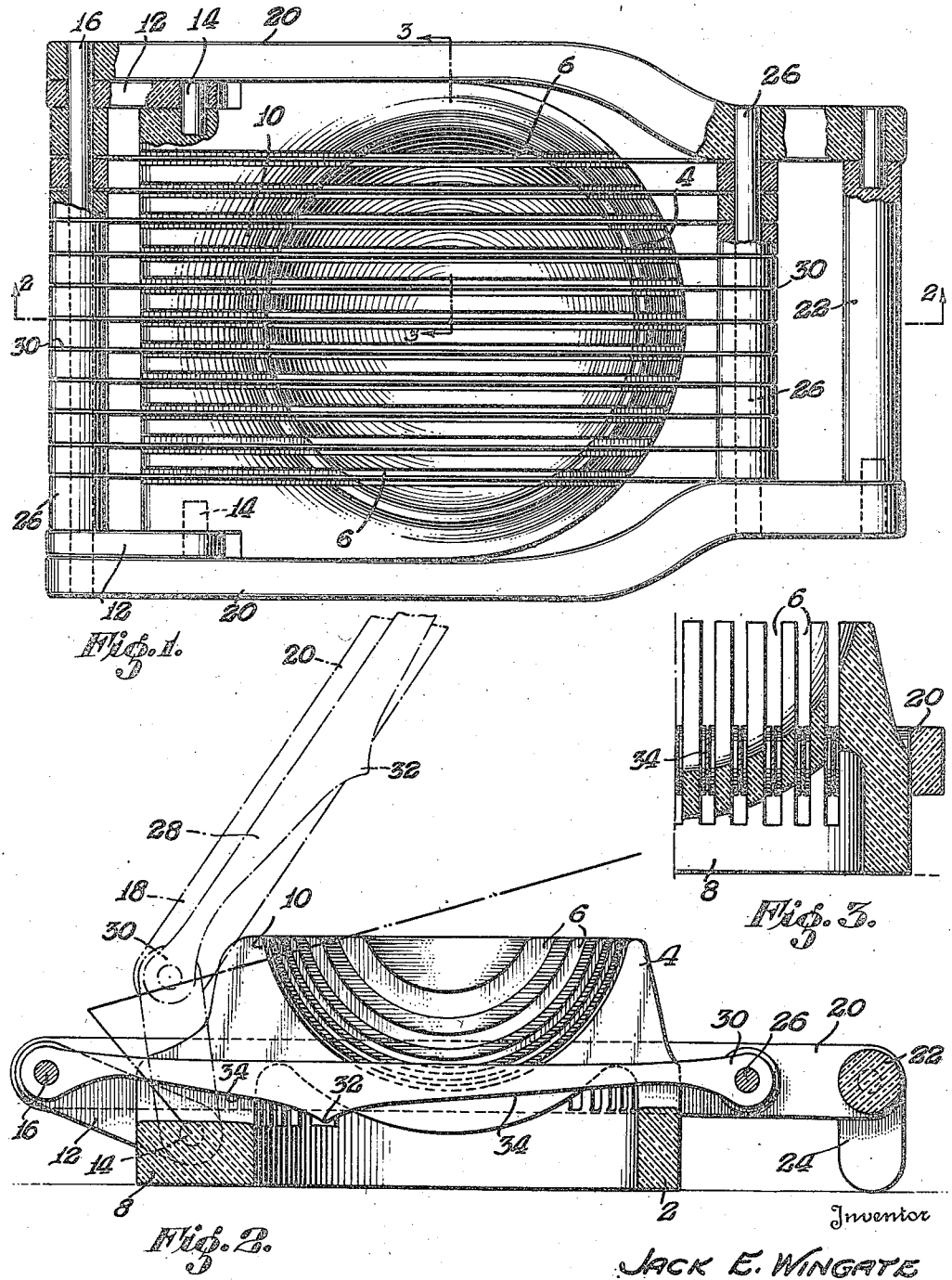

2,405,385

UNITED STATES PATENT OFFICE 2,405,385

SLICING APPARATUS

Jack E. Wingate, Norfolk, Va.

Application September 14, 1943, Serial No. 502,353

1 Claim. (Cl. 146—147)

This invention relates to slicing apparatus and, more particularly to a device for slicing fruits, vegetables and the like, especially tomatoes.

The primary object of this invention is to provide a device for simultaneously producing a plurality of slices from a whole tomato, and to do it quickly without danger of squirting. It is also proposed to provide a tomato slicer which will produce whole, even slices with even, untorn edges and with smooth, unscarified, non-grainy surfaces.

In accordance with these objectives, it is now proposed to provide a slicer having a base, a slotted receptacle, a frame carrying a plurality of blades, and links connecting one end of the frame to the base so that the blades, which slide in the slots in the receptacle, partake of both a downward and transverse cutting stroke. The particular improvements in this device comprise the particular shaping of the blades so as to provide sharply pointed portions at the point of first contact so that the thin, but tough and rubbery skin of a tomato is first pierced before the major cutting operation occurs.

A further improvement resides in the design of the slots in the receptacle and their relation with the mounting of the blade, so that the slots comprise long guideways in which parts of the blades are always engaged. By this arrangement, it is unnecessary to register the blades with the slots each time the blade frame is raised for admission of a tomato into the receptacle, as hitherto encountered in devices of this type because of lateral play in the linkage connecting the blade frame to the base.

These and other objectives will appear from the following specification and drawing, in which:

Fig. 1 is a plan view of the slicer;

Fig. 2 is a cross section taken along the line 2—2 of Fig. 1 and looking in the direction of the arrows; and, Fig. 3 is a fragmentary cross section taken along the line 3—3 of Fig. 1 looking in the direction of the arrows.

Referring now to the drawing, in which like reference numerals denote the same or similar objects, a base 2 has rigidly affixed thereon an open-topped receptacle 4 through which a series of slots 6 are provided. The base and receptacle are of rigid material, preferably of one of the moldable plastics so that they may be molded as an integral unit, although they may be separately molded or machined and subsequently secured together.

It should be particularly noted that at the rear end 8 of the device, the receptacle 8 is provided with a rearwardly and downwardly directed skirt portion 10 through which the slots extend to form guideways for the blades described below. Also, slots 6 are extended through base 2 below the receptacle for drainage, to facilitate washing, and to allow a full working stroke of the blades.

On the rear of base 2, a pair of links 12 are mounted by pivots 14, the other ends of the links being pivoted at 16 to a generally rectangular frame 18, the longitudinal members 20 of which support a handle 22 and vertically disposed stops 24. The cross members 26 of frame 18 support between them a series of blades 28, whose ends 30 are rigidly affixed to the cross members so that the surfaces of the blades always lie in spaced, parallel, vertical planes, so that when a tomato is placed in the receptacle, frame 18 may be pivoted downwardly and pushed longitudinally to cause blades 28 to cut the tomato into a plurality of vertical slices. Elements 32 on blades 28 are provided for overcoming one of the chief difficulties in slicer of this type. From the drawing, it will be apparent that elements 32 comprise a pointed portion on each blade, and the adjacent cutting edges 34 on each blade slope away from the point towards the ends of the blades. Thus, when frame 18 is swung downwardly, points 32 pierce the skin, thereby getting the blades into the tomato without tearing and squirting. When the working stroke is completed, the slices may be removed, either individually or collectively, by inverting the device. Meanwhile, blades 28 will have remained in the rear slot-guideways 10 during all necessary movements so that alignment with slots 6 is assured.

While the invention has been described in detail, it is not to be limited to the specific form shown, nor to the specific use described, since equivalent structures may be substituted, and work other than tomatoes may be sliced. The above specification is therefore by way of example and not by limitation, and embraces the full scope of the following claim.

I claim:

In a device of the type described, a generally flat base having front and rear portion, an open-topped cup-shaped receptacle affixed on said base intermediate said portions, the front and rear walls of said receptacle having a plurality of substantially parallel, open-topped slots therein, said base having slots running from front to rear and registering with those in the receptacle, a generally rectangular frame larger than the receptacle and comprising longitudinal members and cross members, a pair of links pivotally mounting the rear end of said longitudinal members to the rear portion of said base, a plurality of substantially parallel, vertically disposed blades having their ends affixed on said cross members and having sharp lower edges, the edges of said blades adjacent the ends thereof being substantially straight but merging substantially at their midpoints to a downwardly directed point, the rear wall of said receptacle being extended downwardly and rearwardly to said base so that the slots therein form elongated guideways for said blades during all necessary positions in the working stroke thereof.

JACK E. WINGATE.